US008702830B2

(12) United States Patent
Muter (10) Patent No.: US 8,702,830 B2
(45) Date of Patent: Apr. 22, 2014

(54) DIESEL EXHAUST FILTERING APPARATUS (75) Inventor: John Muter, King City (CA)

(73) Assignee: DCL International Inc. (CA)

( * ) Notice: Subject to any disclaimer, the term of this patent is extended or adjusted under 35 U.S.C. 154(b) by 1838 days.

(21) Appl. No.: 11/273,610

(22) Filed: Nov. 14, 2005

(65) Prior Publication Data

US 2007/0107392 A1  May 17, 2007

(51) Int. Cl.
B01D 39/00 (2006.01)

(52) U.S. Cl.
USPC .............. 55/497; 55/307; 55/308; 55/521; 95/268; 180/309

(58) Field of Classification Search
USPC .......... 55/497, 307, 308, 521; 95/268; 180/309; 428/593, 182; 210/433.1, 210/492, 497.1, 456; 96/129
See application file for complete search history.

(56) References Cited

U.S. PATENT DOCUMENTS

| 2,019,186 | A | * | 10/1935 | Kaiser | 96/390 |
|---|---|---|---|---|---|
| 2,720,937 | A | * | 10/1955 | Root, Jr. | 55/500 |
| 3,146,197 | A | * | 8/1964 | Getzin | 210/493.1 |
| 3,293,833 | A | * | 12/1966 | Barany | 55/500 |
| 4,234,324 | A | * | 11/1980 | Dodge, Jr. | 96/99 |
| 4,537,812 | A | * | 8/1985 | Elbers | 428/182 |
| 4,598,063 | A | * | 7/1986 | Retallick | 502/439 |
| 4,652,286 | A | * | 3/1987 | Kusuda et al. | 55/523 |
| 5,589,076 | A | * | 12/1996 | Womack | 210/739 |
| 5,820,646 | A | * | 10/1998 | Gillingham et al. | 55/488 |
| 5,820,835 | A | * | 10/1998 | Sheller et al. | 422/180 |
| 5,853,902 | A | * | 12/1998 | Usui | 428/593 |
| 5,908,480 | A | * | 6/1999 | Ban et al. | 55/482 |
| 6,063,165 | A | * | 5/2000 | Dullien et al. | 95/267 |
| 6,190,784 | B1 | * | 2/2001 | Maus et al. | 428/593 |
| 6,273,938 | B1 | * | 8/2001 | Fanselow et al. | 95/90 |
| 6,548,147 | B1 | * | 4/2003 | Raidel et al. | 428/182 |
| 2003/0121845 | A1 | * | 7/2003 | Wagner et al. | 210/493.1 |
| 2004/0013580 | A1 | * | 1/2004 | Bruck et al. | 422/171 |

OTHER PUBLICATIONS

The American Heritage Dictionary of the English Language: Fourth Edition, 2000.*

* cited by examiner

Primary Examiner — Jason M Greene
Assistant Examiner — Anthony Shumate
(74) Attorney, Agent, or Firm — Harness, Dickey & Pierce, P.L.C.

(57) ABSTRACT

A filtering apparatus having a plurality of passages made up of juxtaposed longitudinally extending channels. The passages are axially divided by a porous filtering media extending across the channels whereby the channels fluidly communicate through the porous filtering media. A pressure differential is created across the filtering media by restricting flow through an end of each channel, with each restriction being at an opposite end from that of the other channel. As flow restriction rather than outright blocking is used, some flow is possible along each passage directly along the channels even if the channels lose the ability to fluidly communicate through clogging of the filtering media.

27 Claims, 11 Drawing Sheets

Modelled Results: 10:1 Taper, Inconel Foam

FIGURE 13

Measured Results: 50% Blocked Linear Channel, 30% Efficiency

FIGURE 14

DIESEL EXHAUST FILTERING APPARATUS

FIELD OF THE INVENTION

This invention relates generally to filtering apparatus and more specifically to apparatus for filtering particulate matter from a diesel engine exhaust gas stream.

BACKGROUND OF THE INVENTION

Diesel engine exhaust gases contain "soot" (particulate matter including fine carbon particles). Under some operating conditions, a considerable amount of soot may be present. The soot, which can be seen as a blackish cloud emanating from an exhaust pipe, is objectionable. Accordingly if it can't be avoided in the combustion process, it needs to be removed.

One manner of removing the soot is by passing the exhaust gases through a filter. A difficulty encountered with the use of a filter is that the filter may become blocked thus interfering with proper engine function by creating too much "back pressure" (i.e. flow restriction) in the exhaust thereby preventing proper outflow of exhaust gases.

Accordingly it is an object of the present invention to provide a filtering apparatus for filtering soot from a diesel engine exhaust which allows at least some gas flow even if a filtering medium associated with the filtering apparatus should become completely blocked.

SUMMARY OF THE INVENTION

In very general terms, the structure of the present invention comprises a plurality of passages made up of juxtaposed longitudinally extending channels. The passages are axially divided by a porous filtering media extending across the channels whereby the channels fluidly communicate through the porous filtering media. A pressure differential is created across the filtering media by restricting flow through an end of each channel, with each restriction being at an opposite end from that of the other channel. As flow restriction rather than outright blocking is used, some flow is possible along each passage directly along the channels even if the channels lose the ability to fluidly communicate through clogging of the filtering media.

In its simplest embodiment, the channels are flow restricted by pinching one end. In more sophisticated embodiments, the channels are tapered lengthwise in opposite directions from the adjacent channels.

More particularly, a filter apparatus is provided which has first and second longitudinally extending channels facing one another and separated by a sheet of porous filtering medium to define a filtering unit having first and second longitudinally extending passages fluidly communicating through the filtering medium. The first and second passages each have an inlet and an outlet at opposite ends thereof with the inlet and outlet of the first passage being respectively adjacent to the inlet and outlet of the second passage. The inlet of the first passage and the outlet of the second passage are each provided with a non-blocking flow restrictor to cause a pressure differential across the filtering medium in response to pressurized fluid being presented to the inlets of the first and second passages. This promotes fluid flow between the first and second passages through the filtering medium while also permitting some fluid flow directly along the first and second passages from their respective inlets through their respective outlets.

The inlet and outlet flow restrictors may be selected to limit, to a predetermined amount, the maximum flow restriction caused by the filtering apparatus in the event that the filtering medium becomes blocked.

A plurality of filtering units may be arranged in a side by side alternating arrangement to define a plurality of the first and second passages with the inlet of each of the first passages adjacent an inlet of one of the second passages on an opposite side of the filtering medium therefrom and the outlet of each of the first passages having an outlet of one of the second passages adjacent thereto on an opposite side of the filtering medium.

The first and second channels may be formed in metal foil with the filter apparatus comprising alternating sheets of metal foil and the porous filtering medium being in one of stacked and wound configuration.

The fluid may be diesel exhaust gas with the filtering medium selected to trap particulate matter, including soot, from the diesel exhaust gas.

The flow restrictor may be a narrowing of the inlet of the first passages and the outlet of the second passages.

The first and second channels may taper along their respective lengths.

The first and second channels may have generally parallel sides with the narrowing being a result of the crimping of the inlet of each of the first passages and the outlet of each of the second passages.

The channels may taper in a 10 to 1 convergence ratio. The inlets of the second passages and the outlets of the first passages may be about 10 mm (0.4 inches) wide, 2 mm (0.08 inches) high and 90 mm (3.5 inches) long.

The metal foil may be an iron chromium aluminum alloy and the filtering medium may be an open cell foam or a sintered non-woven fibre fleece of iron chromium aluminum alloy.

The invention further provides a filtering apparatus having first and second sheets formed into a plurality of longitudinally extending tapered channels having opposite inlet and outlet ends, with the channels alternating between narrowing and broadening along respective lengths thereof between the inlet and outlet ends. The first and second sheets may be stacked one above the other with the inlet and outlet ends corresponding and a sheet of porous filtering medium interspersed therebetween to define a stacked set. A longitudinally extending housing extends about the stacked set to define a fluid conduit extending between the inlet and outlet ends.

The stacked set may be wound, along with a further sheet of the porous filtering medium to separate adjacent layers, in a spiral having an axis parallel to the channels with the housing at least substantially sealing about an outer perimeter thereof to avoid gas leakage therebetween.

The filtering apparatus may comprise a plurality of the stacked sets arranged one above another in a block with a sheet of the porous filtering medium therebetween. The housing may have a parallelepiped cross-sectional shape closely conforming to an outer perimeter of the block to avoid gas leakage therebetween. The housing may be cylindrical or of rectangular cross-section.

DESCRIPTION OF THE DRAWINGS

Preferred embodiments of the invention are described below with reference to the accompanying drawings in which.

DESCRIPTION OF PREFERRED EMBODIMENTS

A filter apparatus according to the present invention is generally indicated by reference 20 in the accompanying illustrations. The filter apparatus 20 has first and second adjacent and longitudinally extending passages 22 and 24 respectively, each defined by a first channel 26 and a second channel 28 which face each other (i.e. open toward each other). The first and second channels 26 and 28 respectively, are separated by a sheet of porous filtering medium 30 to define the first and second passages 22 and 24.

The first and second passages 22 and 24 fluidly communicate through the filtering medium 30.

Each first passage 22 has an inlet 32 and an outlet 42 at opposite ends thereof. Each second passage 24 has an inlet 34 and an outlet 44 at opposite ends thereof. The inlets 32 and 34 of the first passage 22 and second passage 24 respectively are adjacent one another. The outlets 42 and 44 of the same first passage 22 and second passage 34 respectively are also adjacent one another.

Characterized another way, the first and second channels define a passage which is divided by the porous filtering medium 30 into first and second adjacent passages, 22 and 24 respectively which fluidly communicate through the porous filtering medium 30.

The filter apparatus 20 would in most applications typically have many first passages 22 and second passages 24, in which case, as illustrated, a plurality of first channels 26 and second channels 28 would be formed in alternating sequence in a first sheet of formable material 50. Similarly, a plurality of first channels 26 and second channels 28 would be formed in alternating sequence in a second sheet of formable material 60. The filtering medium 30 would, as suggested above, comprise a sheet of porous material sandwiched between the first sheet 50 and the second sheet 60.

The respective materials of the first sheet 50, second sheet 60 and filtering medium would be selected based on the service requirements. For filtering apparatus 20 intended for use in diesel engine exhaust filtering applications, the first sheet 50 and the second sheet 60 may be an iron chromium aluminum alloy (FeCrAl). Such material is commonly used for catalyst support substrates and the aluminum serves both as a corrosion inhibitor and a convenient surface on which to anchor a catalyst coating. Both properties are desirable in the present application. Initially experimental parts used nickel foam as the filtering medium but it was found that pure nickel oxidizes quickly towards the upper end of a diesel exhaust temperature range. Better results have been obtained using an austenitic nickel-chromium based alloy such as sold under the trademark INCONEL of Special Metals Corporation or FeCrAl as the material. Acceptable results have been obtained using either an open cell foam or a sintered nonwoven fibre fleece. Either material is available in both forms. Specifically, materials have been tested with approximately 90% porosity and a mean pore or void size of about 300 μm. Thickness has varied between 0.2 and 4 mm (0.008 and 0.16 inches).

In order to cause a pressure differential across the filtering medium 30, the inlet 32 of the first passage 22 and the outlet 44 of the associated second passage 24 present different flow restriction than the respective inlet 34 of the associated second passage 24 and outlet 42 of the first passage 22. More particularly, the inlet 32 of the first passage 22 would impose greater flow restriction than the inlet 34 of the associated second passage 24. The outlet 42 of the first passage 22 would impose less flow restriction than the outlet 44 of the associated second passage 24.

The disparity in flow restriction may be achieved by making the inlet 32 of the first passage 22 of smaller cross-sectional area than the inlet 34 of the second passage 24 and the outlet 42 of the first passage 22 of greater cross-sectional area than the outlet 44 of the second passage 24. This will have the general effect of causing, for a given gas pressure at the respective inlets 32 and 34, greater pressure in the first passage 22 than in the second passage 24. Accordingly this will promote gas flow from the first passage through the filtering medium 30 into the second passage 24. Such is illustrated by arrows 70.

Although it is expected that there will be general fluid (gas) flow from the second passage 24 into the first passage 22, this may not be the case along the entire length of the first passage 22 and second passage 24. Computer modelling suggests that there may be regional anomalies wherein flow actually takes place in the reverse direction, i.e. from the first passage 22 to the second passage 24. Such may be a function of operating conditions, channel configuration and the degree of blocking of the filtering medium 30. Accordingly, the arrows 70 should be considered as illustrative of a general flow direction rather than a specific actual flow direction.

As a practical matter, filtering occurs upon passing exhaust gases (or other fluid) through the filtering media 30. Accordingly, regional anomalies may not affect the overall performance of the filter apparatus 20.

The first channels 26 and second channels 28 may be tapered as illustrated in FIGS. 1 through 8. Alternatively, they may be parallel sided as illustrated in FIG. 9. In the former arrangement, flow restriction is inherent in the tapering of the first and second passages 22 and 24 respectively. In the latter arrangement, flow restriction may be achieved by pinching the inlets 32 of the first passages 24 and the outlets 44 of the second passages 22.

A benefit to the tapered arrangement illustrated in FIGS. 1 through 8 is that it provides more "robust" performance characteristics. In other words, the tapered arrangement performs well over a large range of velocities as it provides a more uniform velocity profile through the filtering medium 30 than the "pinched end" version of FIG. 9. While it is believed that the pinched design works principally via the restriction of exhaust gas flow at the pinched end, other factors may be relevant to flow in the tapered design. The tapered design causes gas flow to accelerate along the length of the filtering media 30. The very low angle of incidence also allows for long residence times within the filter media.

As the arrangement of the present invention doesn't entirely close either the inlet 32 of the first passages 22 or the outlet 44 of the second passages 24, it is a non-blocking arrangement. In other words, should the filtering medium 30 become blocked, flow will still occur along the first passages 22 and the second passages 24 directly from their respective inlets 32 and 34 through their respective outlets 42 and 44. Preferably any flow restriction will be selected to provide a predetermined maximum back pressure. Accordingly, any blockage will still enable operation of an engine associated with the filter apparatus 20 of the present invention.

In order to cause flow through the first and second passages 22 and 24 respectively, the arrangement of the first passages 22 and second passages 24 are mounted within a housing 80 which fits closely about the passages to minimize gas flow between the housing 80 and the passages.

Figure 8:
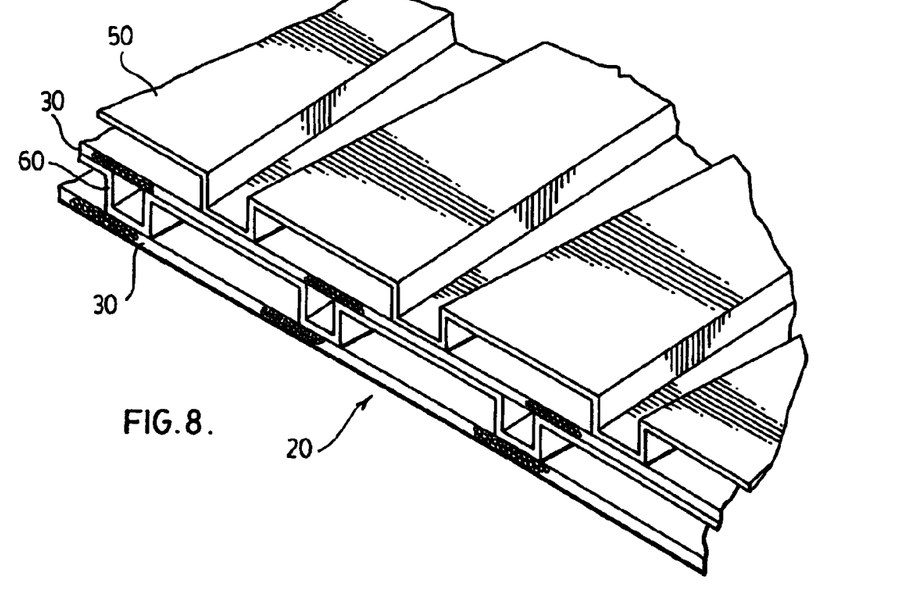
FIG. 8 is a perspective view showing an end of two formed and two porous sheets alternatingly arranged as they might be prior to the stacking of FIG. 6 or the winding of FIG. 7.
Figure 9:
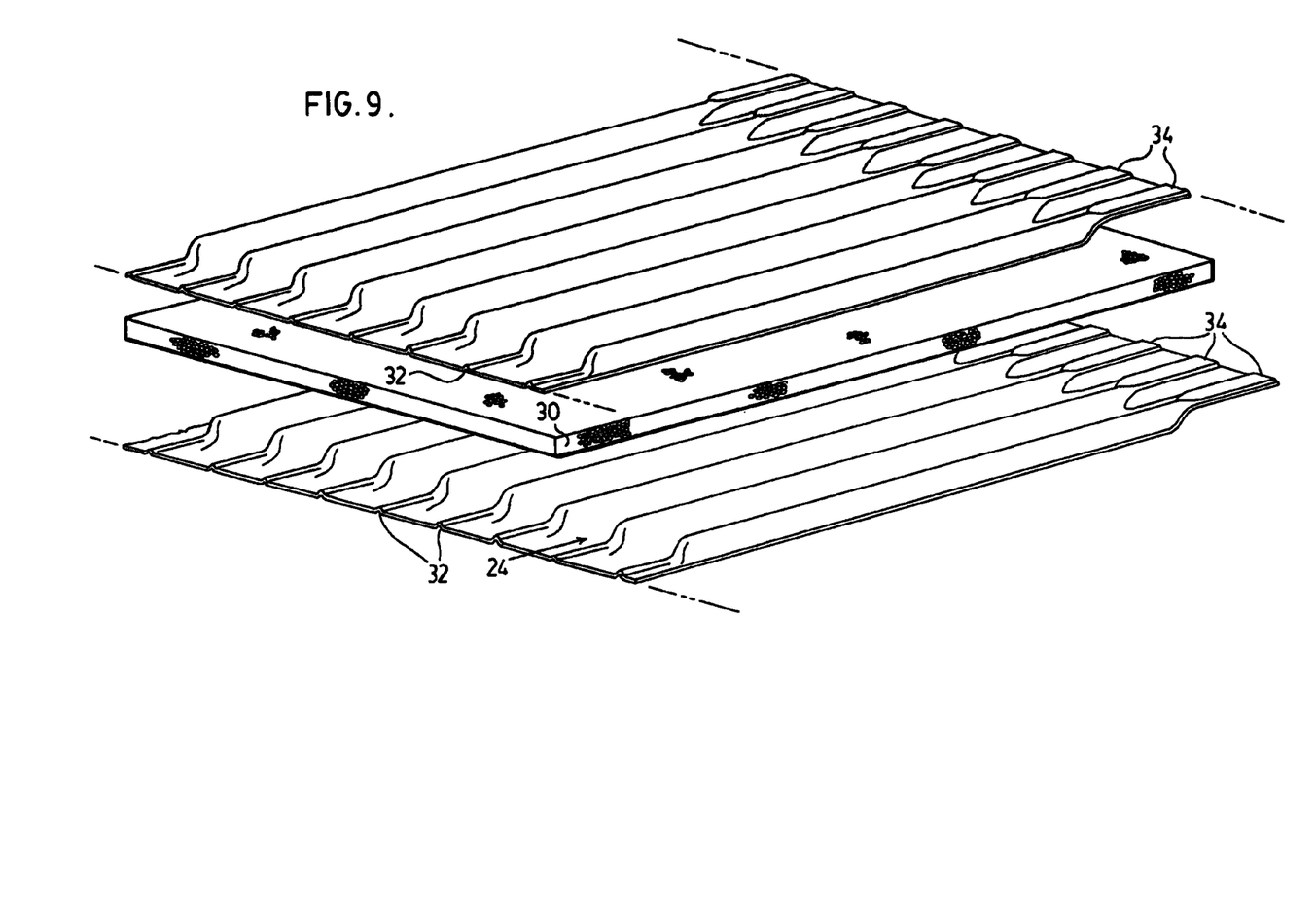
FIG. 9 is an exploded view of an alternate embodiment of the present invention similar to FIG. 5 but illustrating differently shaped formed channels.

The first sheet 50 and the second sheet 60 may be placed on either side of the filtering medium 30 with a further sheet 30 of filtering medium therebelow and then wound about a mandrel into a spinal such as illustrated in FIGS. 8 and 9. In such an arrangement the housing 80 may be of cylindrical cross-section as illustrated. Alternatively the sheets 30, 50 and 60 may be wound into an elliptical configuration (not illustrated) in which case an elliptical housing 80 would be required. It is also possible to form the structure by simply placing a first sheet 50 over the filtering medium 30 and winding the two sheets together. In effect, the first sheet 50 of one layer acts as the second sheet 60 relative to an overlying layer.

From a manufacturing standpoint, it is simpler to form the structure using a single corrugated sheet such as the sheet 50 and a single layer of filtering medium 30. Preferably the filtering medium 30 and the corrugated sheet (50 or 60) are brazed together using an amorphous nickel brazing foil. As a practical matter, the process of winding will not yield appropriate alignment of all of the first channels 22 and second channels 24 and accordingly all of the flow won't be exactly as illustrated. In the case of tapered channels there will be some overlap which may result in flow from one channel into two adjacent channels or vice versa, depending on the velocity profile in the affected region. The net result will however provide effective filtering. Should it be desirable to provide good alignment, then a stacked rather than a wound configuration would be preferred.

Figure 1:
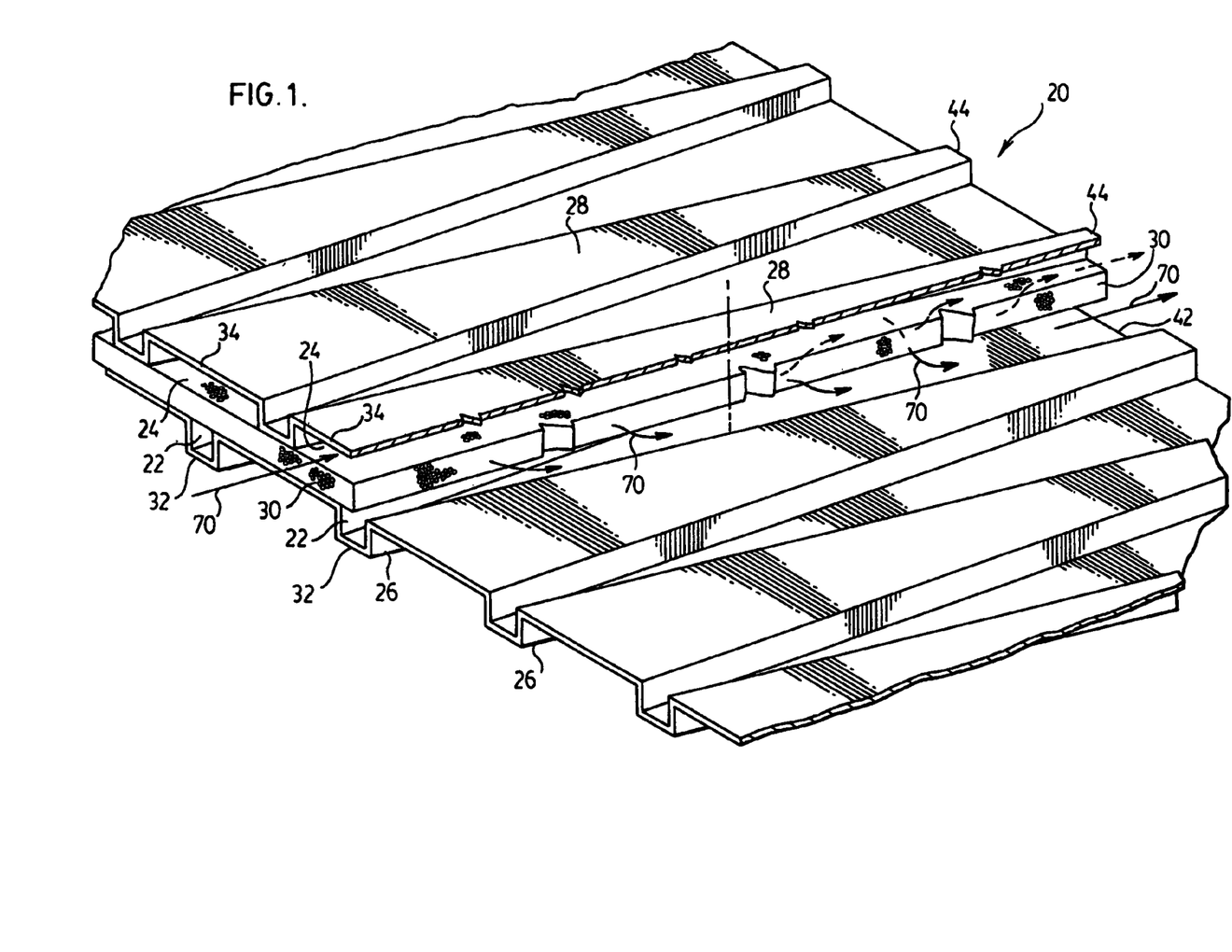
FIG. 1 is a perspective view, partially cut away illustrating the basic structure and operating principles of a filtering apparatus according to the present invention.
Figure 2:
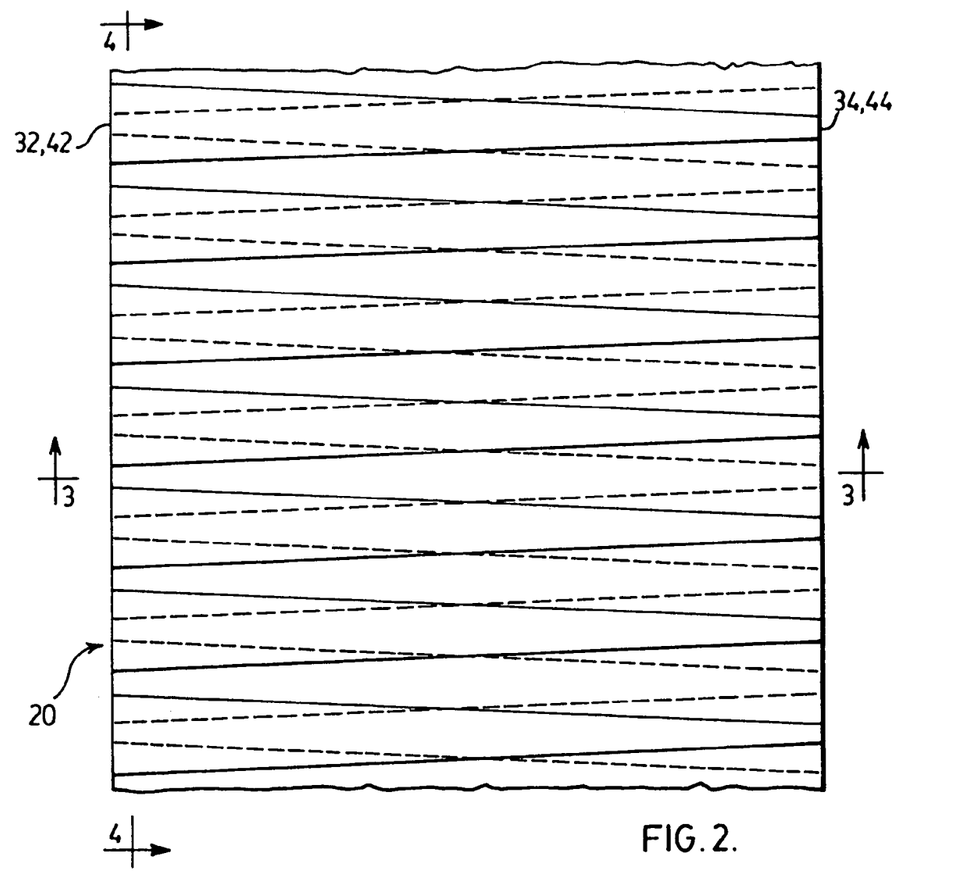
FIG. 2 is a top plan view of the structure of FIG. 1 absent the cut away portion.
Figure 3:
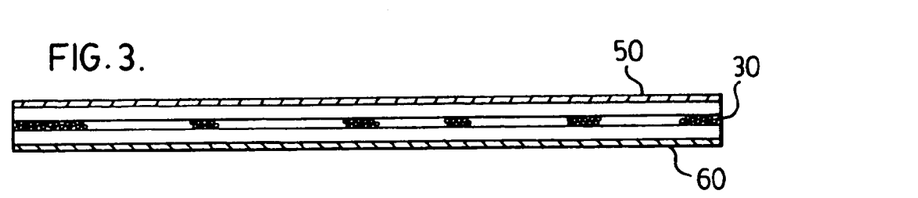
FIG. 3 is a section on line 3-3 of FIG. 2.
Figure 4:
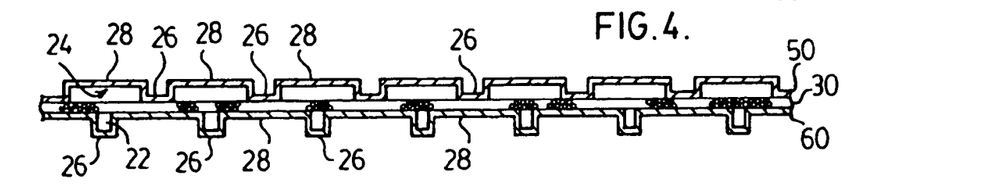
FIG. 4 is a section on line 4-4 of FIG. 2.
Figure 5:
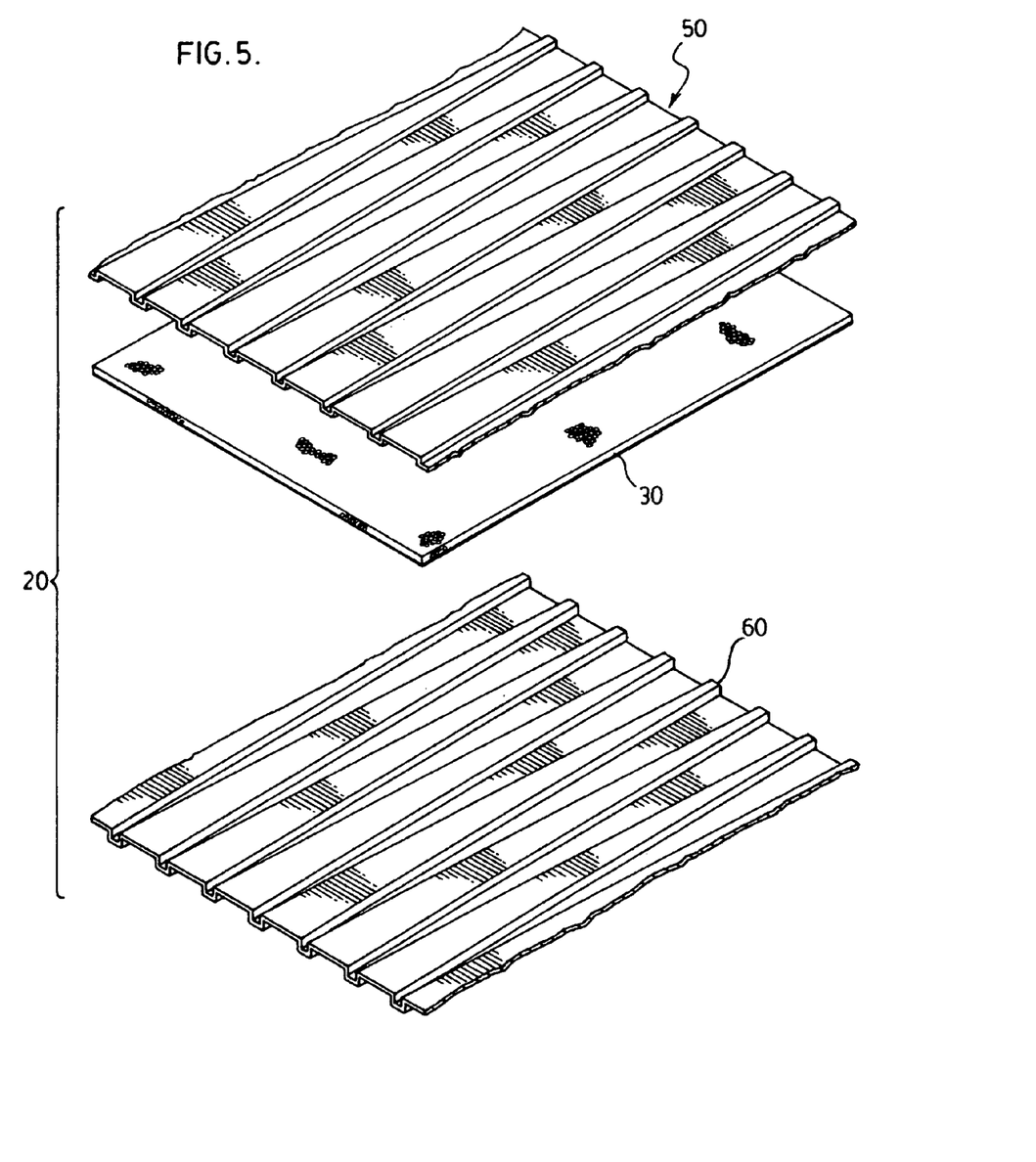
FIG. 5 is an exploded view of the structure of FIG. 1.
Figure 6:
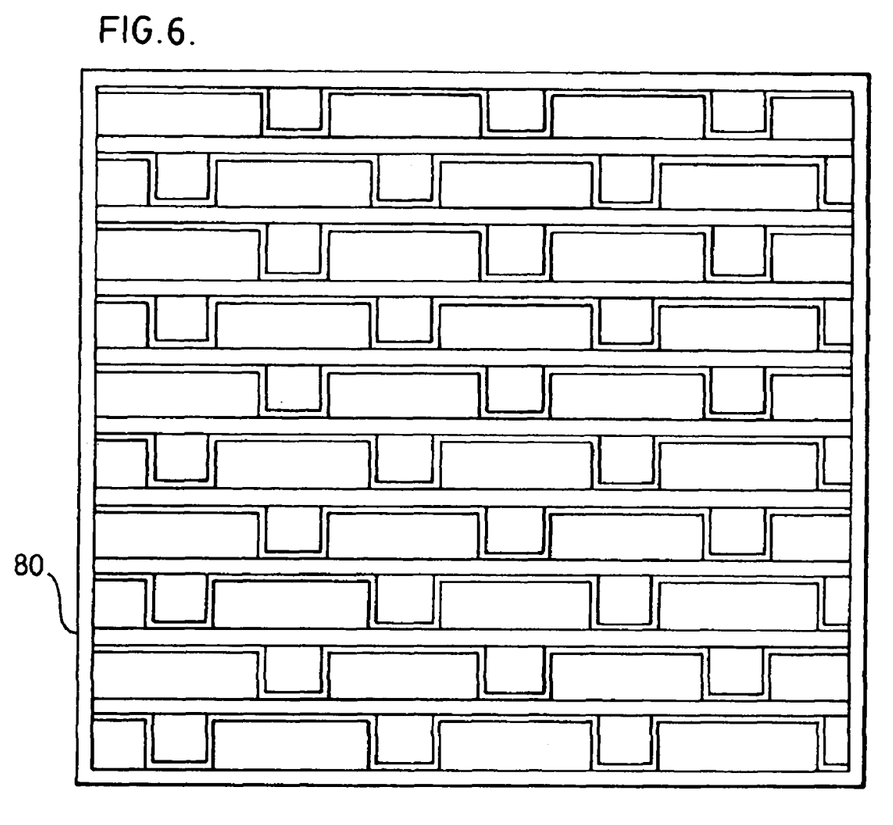
FIG. 6 is an end view of an apparatus according to the present invention having a stacked configuration.
Figure 6A:
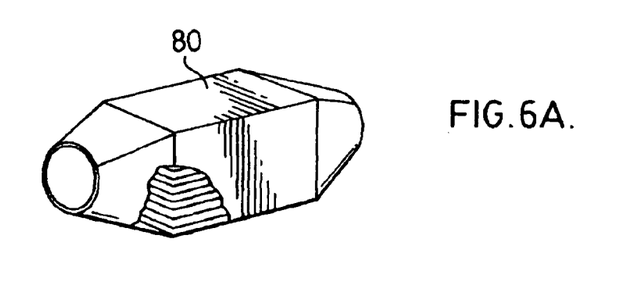
FIG. 6A is a partially cut away perspective view of a filtering apparatus similar to that of FIG. 6 but having rounded inlet and outlet ends.
Figures 7, 7A:
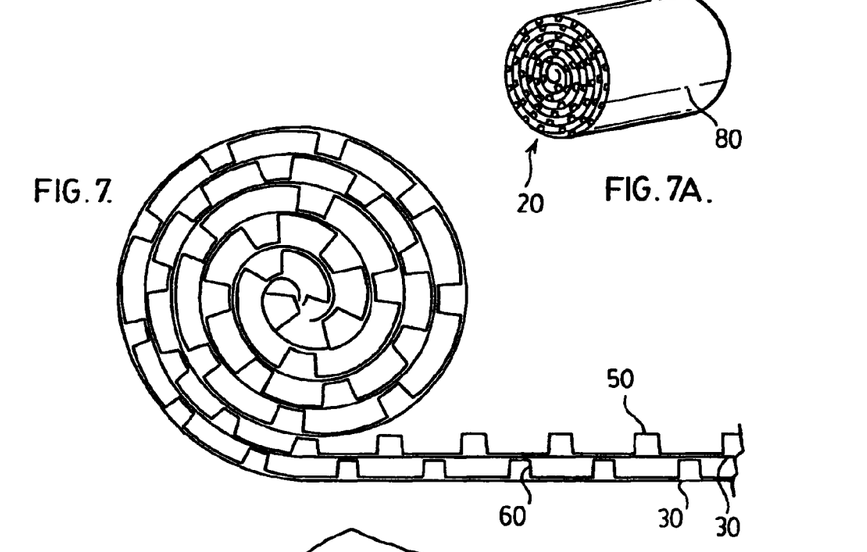
FIG. 7 is an end view of an apparatus according to the present invention illustrating a wound configuration.
FIG. 7A is a perspective view of an apparatus according to the present invention in a wound configuration within a housing.

As an alternative to winding, the basic structure comprising the first sheet 60 and the second sheet 70 may be replicated in a stack 72 such as illustrated in FIG. 6. Such will require a housing having at least a rectangular cross-section. Other stacking arrangements may be feasible such as diamond, hexagonal or octagonal or other cross-sectional shapes. The corresponding housing will typically be of parallelepiped shape, as illustrated in FIG. 6A, and preferably fitting tightly about the stack to avoid leakage therebetween. Alternatively, a sealing medium may be provided between the housing 80 and the stack 72. The sealing medium may for example be an inwardly extending flange or a resilient, heat resistive fibrous material (not illustrated). As with the wound arrangement, the configuration may also be achieved by layers comprising a first sheet 50 (or a second sheet 60) stacked one above the other with each successive layer being offset so that a narrow opening is above (or below) a wide one.

As suggested above, better results have been obtained at least in initial testing with tapered rather than parallel sided first and second channels, 22 and 24 respectively. Although the specific dimensions selected will depend on the particular application by way of example early testing has shown favourable results with a convergence ratio of about 10:1 with a height of the first channel 26 and the second channel 28 of about 2 mm (about 0.08 inches), a length of about 90 mm (about 3.5 inches) and a breadth of about 10 mm (about 0.4 inches) for the inlets 34 of the second passages and outlets 42 of the first passages. It is expected that a lower limit for the convergence ratio would be about 4:1 defined by minimal effectiveness. It is expected that the upper limit for the convergence ratio would be about 20:1 in consideration of tooling demands.

The invention is further illustrated by way of the examples set out below.

Bench testing and computer modelling were carried out utilizing a wound filtering apparatus having tapered channels with a convergence ratio of 10:1 with the inlets being approximately 10 mm (0.4 inches) by 2 mm (0.08 inches) high and the channels being about 90 mm (3.5 inches) long. An INCONEL foam media was utilized having a pore size of approximately 540 microns with approximately 300 cells per square inch.

EXAMPLE 1

Figure 10:
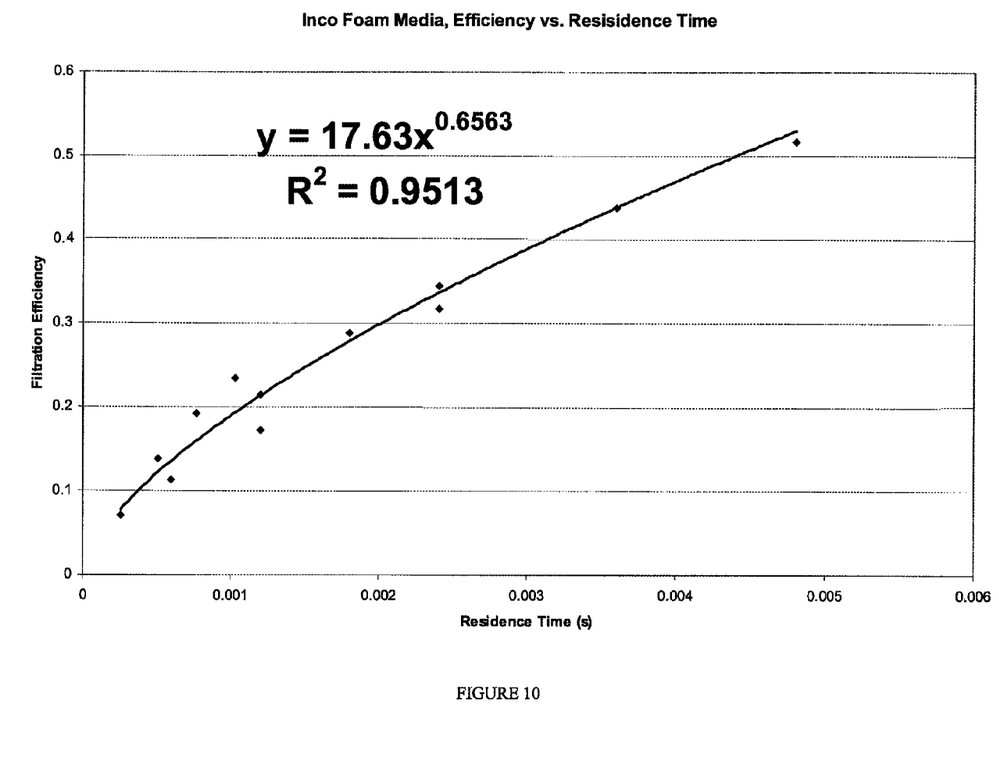
FIG. 10 is a graph of filter efficiency vs. residence time.

FIG. 10 illustrates filtration efficiency vs. residence time. It can be seen that residence time is a very important factor in efficiency. For example a residence time of 0.001 seconds has an efficiency below 20% whereas increasing the residence time to 0.005 seconds yields an efficiency of greater than 50%.

EXAMPLE 2

Figure 11:
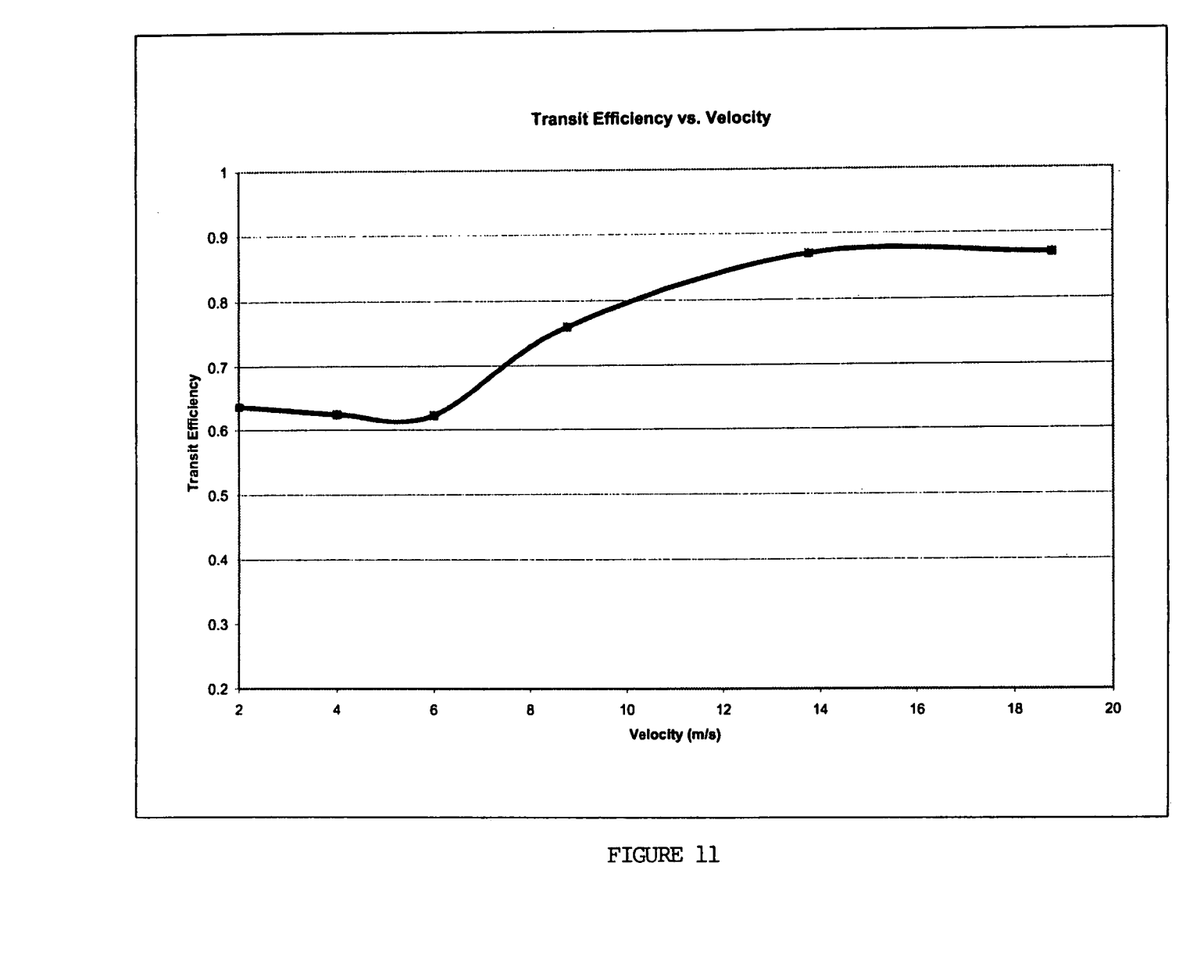
FIG. 11 is a graph showing transit efficiency vs. velocity.

FIG. 11 illustrates a relationship between transit efficiency and velocity over an operating range of from 2 to 20 m/s (6.6 to 66 ft/s). The transit efficiency is approximately 0.8 at 10 metres per second (about 33 ft/s) and tapers off at around 13 metres per second (about 43 ft/s) to just under 0.9.

EXAMPLE 3

Figure 12:
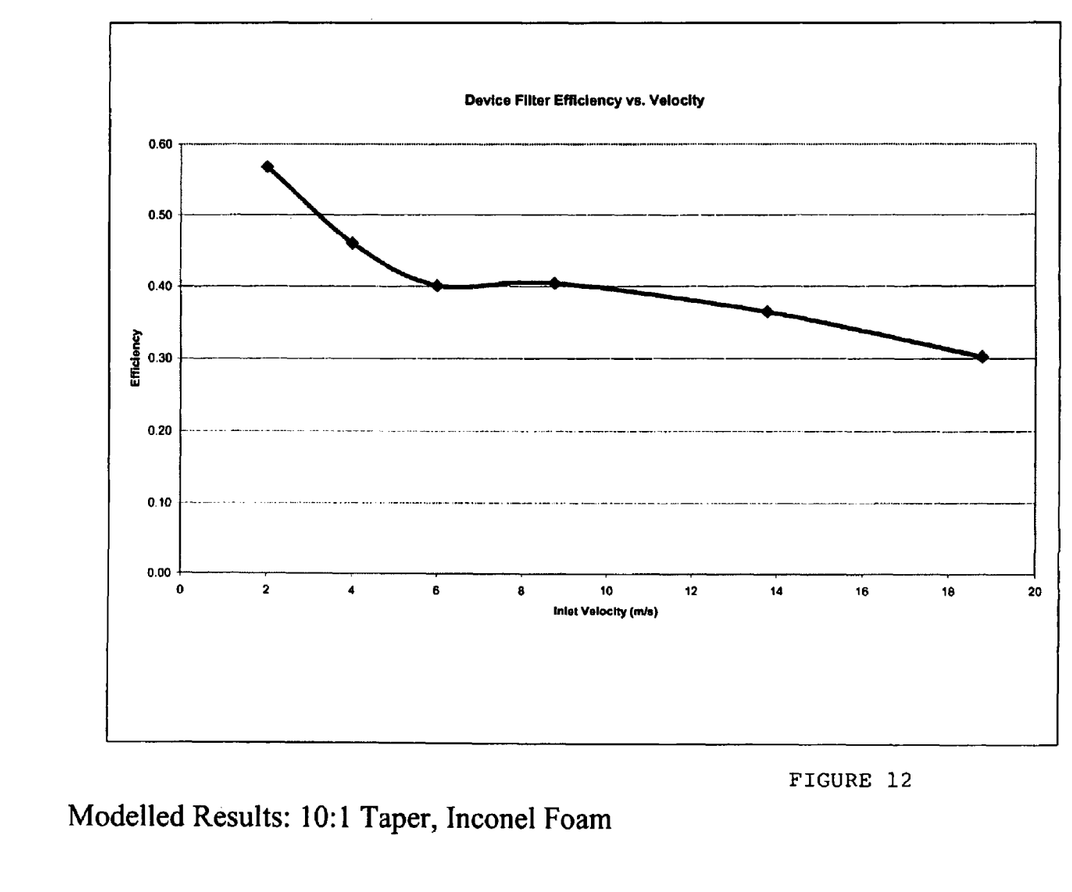
FIG. 12 is a graph showing efficiency vs. inlet velocity.

FIG. 12 is a graph illustrating the filtering efficiency vs. velocity. Unlike transit efficiency, the filtering efficiency diminishes as the velocity increases. No doubt this is a function of the reduced residency time at higher velocity. There may however be other flow factors involved.

EXAMPLE 4

Figure 13:
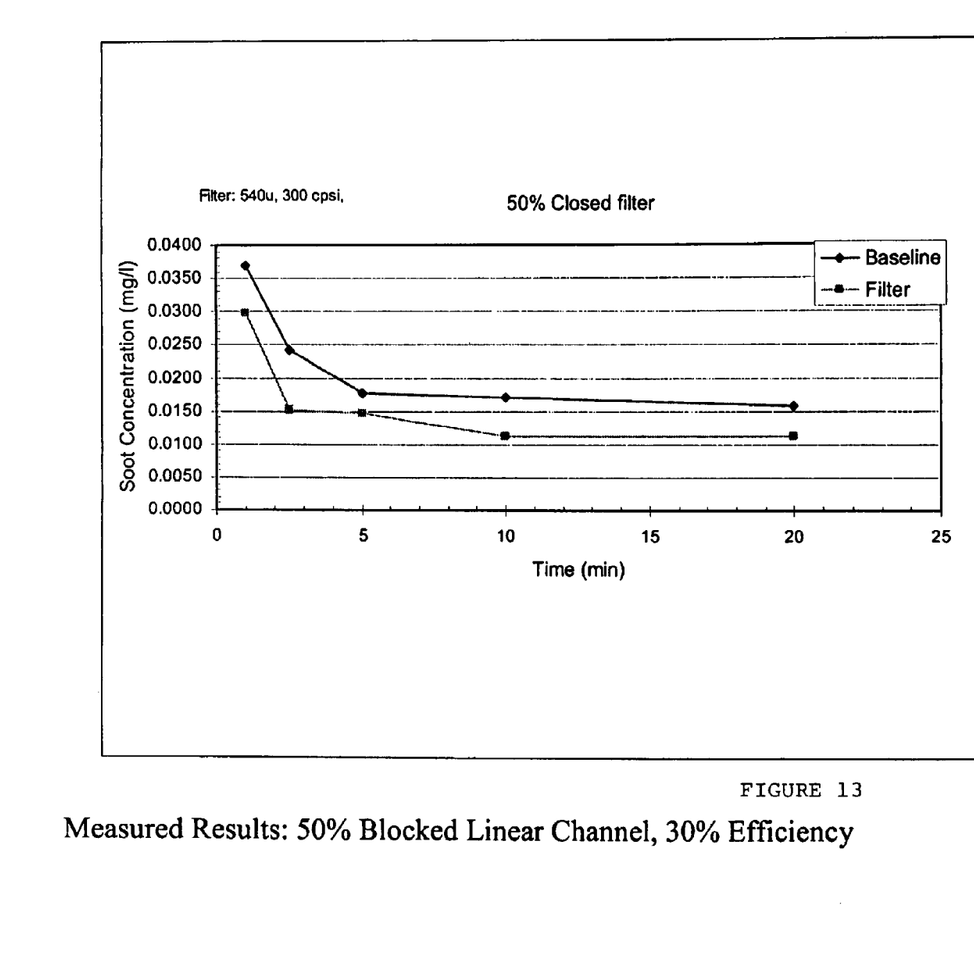
FIG. 13 is a graph showing soot concentration vs. time.

FIG. 13 illustrates measured particulate emissions, baseline and with a device, with measured reduction being about 30%.

Figure 14:
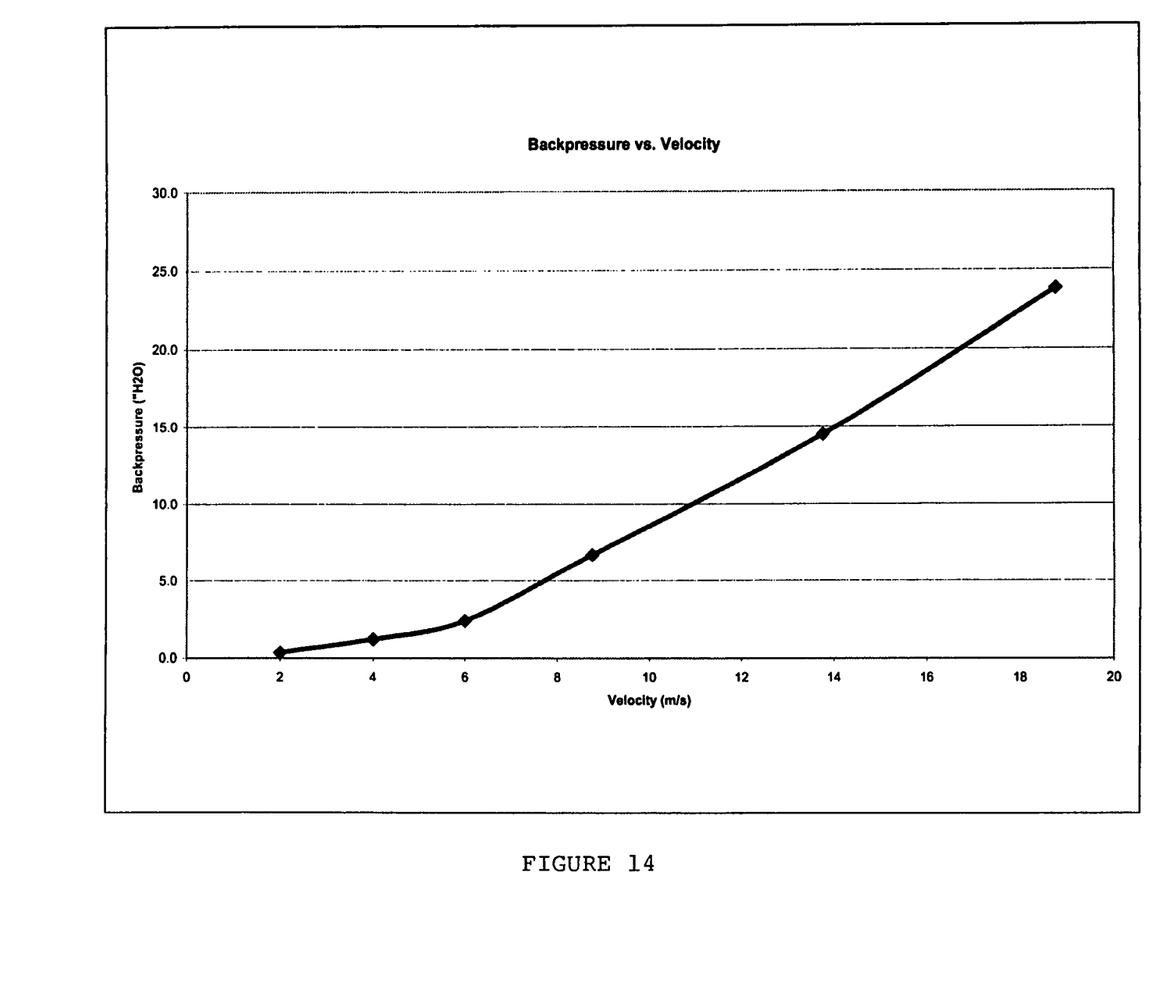
FIG. 14 is a graph showing back pressure vs. velocity.

FIG. 14 illustrates the relationship between back pressure and velocity. As one would expect, the back pressure increases significantly with velocity. It is interesting to note that while there is a rather sharp increase from between about 5 metres per second (about 16.4 ft/s) and 7 metres per second (about 23 ft/s), the increase is relatively linear beyond that point up to the limit of the design operating range.

The above description is intended in an illustrative rather than a restrictive sense. Variations may be apparent to those skilled in the art without departing from the spirit and scope of the invention as defined by the claims set out below.

The invention claimed is:

1. A filtering apparatus comprising:
   first and second adjacent longitudinally extending channels facing one another and separated by a sheet of porous filtering medium to define a filtering unit having first and second longitudinally extending passages fluidly communicating only through said filtering medium;
   said first and second passages each having an inlet and an outlet at opposite ends thereof with said inlet and said outlet of said first passage being respectively adjacent said inlet and said outlet of said second passage;
   the filtering medium having edges terminating at the inlet and outlet ends of the channels so that the filter medium does not block the inlet or outlets ends, the inlet and outlet ends being open;
   said inlet of said first passage and said outlet of said second passage each being provided with a non-blocking flow restrictor to cause a pressure differential across said filtering medium in response to pressurized fluid being presented to said inlets of said first and second passages to promote fluid flow between said first and second passages through said filtering medium while also permitting some fluid flow directly along said first and second passages from said inlets and through said outlets thereof, wherein said first and second channels are not completely blocked by filtering media so as to permit flow directly along said first and second channels if said filtering media becomes blocked.

2. The filtering apparatus of claim 1 wherein said inlet and outlet flow restrictors are selected to limit, to a predetermined amount, the maximum flow restriction caused by said filtering apparatus in the event that said filtering medium becomes blocked.

3. The filtering apparatus of claim 2 further comprising:
   a plurality of said filtering units arranged in side-by-side alternating arrangement to define a plurality of said first and second passages with said inlet of each of said first passages having said inlet of one of said second passages adjacent thereto on an opposite side of said filtering medium and,
   said outlet of each of said first passages having said outlet of one of said second passages adjacent thereto on said opposite side of said filtering medium.

4. The filtering apparatus of claim 3 wherein said first and second channels are formed in metal foil and said apparatus further comprises alternating sheets of said metal foil and said porous filtering medium in one of stacked and wound configuration.

5. The filtering apparatus of claim 4 wherein said fluid is diesel exhaust gas and said filtering medium is selected to trap particulate matter, including soot, from said diesel exhaust gas.

6. The filter apparatus of claim 5 wherein said flow restrictor is a narrowing of said inlet of said first passages and said outlet of said second passages.

7. The filter apparatus of claim 6 wherein said first and second channels taper along their respective lengths.

8. The filter apparatus of claim 6 wherein said first and second channels have generally parallel sides between respective of said inlets and said outlets and said narrowing is a result of crimping of said inlet of said first passages and said outlet of said second passages.

9. The filter apparatus of claim 7 wherein said channels taper in a 10:1 convergence ratio.

10. The filter apparatus of claim 9 wherein said inlets of said second passages and said outlets of said first passages are about 10 mm (0.4 inches) wide, 2 mm (0.08 inches) high and 90 mm (3.5 inches) long.

11. The filter apparatus of claim 10 wherein said metal foil is an iron chromium aluminum alloy and said filtering medium is at least one of an open cell foam and a sintered non-woven fibre fleece of an austenitic nickel chromium based alloy or FeCrAl alloy capable of surviving in said diesel exhaust gas environment.

12. A filter apparatus comprising:
   first and second sheets formed into a plurality of longitudinally extending tapered channels having opposite inlet and outlet ends, said channels alternating between narrowing and broadening along respective lengths thereof between said inlet and outlet ends;
   said first and second sheets being stacked one above the other with said inlet and outlet ends corresponding, and a sheet of porous filtering medium interspersed therebetween to define a stacked set, the filtering medium having edges terminating at the inlet and outlet ends of the channels so that the filter medium does not block the inlet or outlet ends ,the inlet and outlet ends being open;
   a longitudinally extending housing extending around said stacked set defining a fluid conduit extending between said inlet and outlet ends; and
   wherein said inlet and outlet ends in the first and second sheets are not completely blocked by filtering media so as to permit flow directly along said channels if said filtering media becomes blocked.

13. The filtering apparatus of claim 12 wherein said channels taper in a convergence ratio of from about 4:1 to about 20:1.

14. The filtering apparatus of claim 13 wherein said stacked set is wound, along with a further sheet of the porous filtering medium to separate adjacent layers, in a spiral having an axis parallel to said channels and said housing at least substantially sealing about outer perimeter to avoid gas leakage therebetween.

15. The filtering apparatus of claim 13 further comprising a plurality of said stacked sets arranged one above another in a block within a sheet of said porous filtering medium therebetween and said housing has a parallelepiped cross-sectional shape closely confirming to an outer perimeter of said block to avoid gas leakage therebetween.

16. The filtering apparatus of claim 14 wherein said metal foil is an iron chromium aluminum alloy and said filtering medium is at least one of an open cell foam and a sintered non-woven fibre fleece of an austenitic nickel chromium based alloy or FeCrAl alloy capable of surviving in said diesel exhaust gas environment.

17. The filtering apparatus of claim 16 wherein said housing is cylindrical.

18. The filtering apparatus of claim 15 wherein said metal foil is an iron chromium aluminum alloy and said filtering medium is at least one of an open cell foam and a sintered non-woven fibre fleece of an austenitic nickel chromium based alloy or FeCrAl alloy capable of surviving in said diesel exhaust gas environment.

19. The filtering apparatus of claim 18 wherein said housing is of rectangular cross-section.

20. A filtering apparatus comprising a plurality of longitudinally extending adjacent passages, said passages being axially divided by a porous filtering media into first and second juxtaposed channels which fluidly communicate only through said filtering media;

one end of each of said first and second channels having a flow restriction with said flow restriction of said first channel being at an opposite end of said passage from said flow restriction of said second channel, the filtering medium having edges terminating at the ends of the channels so that the filter medium does not cover the ends, the ends being open;

wherein said first and second channels are not completely blocked by filtering media so as to permit flow directly along said first and second channels if said filtering media becomes blocked.

21. The filtering apparatus of claim 4 having one sheet of said metal foil and one sheet of said porous filtering medium brazed together and either cut and stacked in said stacked configuration or wound in said wound configuration.

22. A filtering apparatus comprising:
a first sheet formed into a first plurality of longitudinally extending channels;
a second sheet formed into a second plurality of longitudinally extending channels;
a filter medium disposed between said first and second sheets and cooperating with said first and second pluralities of longitudinally extending channels to form first and second pluralities of passages; and
non-blocking flow restrictors disposed at inlets of said first plurality of passages and outlets of said second plurality of passages, said non-blocking flow restrictors providing a pressure differential across said filter medium in response to a pressurized fluid being introduced to said first and second pluralities of passages,
wherein said first and second pluralities of longitudinally extending channels include longitudinally extending openings facing each other to allow said pressure differential to force at least a portion of said pressurized fluid to communicate between said first and second pluralities of longitudinally extending channels through said longitudinally extending openings; and
the filtering medium having edges terminating at the inlets and outlets of the passages so that the filter medium does not block the inlets or outlets, the inlets and outlets being open.

23. The filtering apparatus of claim 22 wherein said non-blocking flow restrictors are selected to limit, to a predetermined amount, the maximum flow restriction caused by the filtering apparatus in the event that said filter medium becomes blocked.

24. The filtering apparatus of claim 22 wherein said first and second pluralities of longitudinally extending channels taper in a convergence ratio of from about 4:1 to about 20:1.

25. The filter apparatus of claim 22 wherein said outlets of said first plurality of passages and said inlets of said second passages are about 10 mm (0.4 inches) wide, 2 mm (0.08 inches) high and 90 mm (3.5 inches) long.

26. The filter apparatus of claim 22 wherein said first and second sheets are formed from iron chromium aluminum alloy and said filter medium is at least one of an open cell foam and a sintered non-woven fibre fleece of an austenitic nickel chromium based alloy or FeCrAl alloy capable of surviving in a diesel exhaust gas environment.

27. A filtering apparatus for exhaust from diesel engines, said filtering apparatus comprising:
a first metal foil sheet having a plurality of longitudinally extending tapered channels formed therein, each channel having an opposite inlet and outlet ends, said channels being alternately tapering along respective lengths thereof between said inlet and outlet ends;
a second metal foil sheet having a plurality of longitudinally extending tapered channels formed therein, each channel having an opposite inlet and outlet ends, said channels being alternately tapering along respective lengths thereof between said inlet and outlet ends;
said first and second sheets being stacked one above the other such that a broadened inlet of one channel in one sheet is next to a narrower inlet of an adjacent sheet;
a sheet of porous filtering medium being interspersed between the first and second sheets, the filtering medium having edges terminating at the inlet and outlet ends of the sheets so that the filter medium does not block the inlet or outlets ends, the inlet and outlet ends being open;
the tapered channels causing a pressure differential across the filtering medium in response to diesel exhaust being presented to the inlets of the channels, the diesel exhaust flowing from the channels of one sheet through the filter medium into channels of an adjacent sheet while also permitting some fluid flow directly along the channels in the first and second sheets wherein the diesel exhaust is permitted to flow directly along said channels if the filtering medium becomes blocked;
said metal foil sheets and filtering medium being wound in a spiral; and
a housing extending around the spiral defining a fluid conduit extending between said inlet and outlet ends.

* * * * *